United States Patent [19]

Straayer

[11] Patent Number: 4,965,749

[45] Date of Patent: Oct. 23, 1990

[54] METHOD AND APPARATUS PROVIDING SKIP LINE ASYNCHRONOUS IMAGING

[75] Inventor: Ronald J. Straayer, South Windsor, Conn.

[73] Assignee: The Gerber Scientific Instrument Company, South Windsor, Conn.

[21] Appl. No.: 374,252

[22] Filed: Jun. 30, 1989

[51] Int. Cl.⁵ .............................................. G01D 9/42
[52] U.S. Cl. .................................... 364/520; 364/519; 346/154
[58] Field of Search ............................... 364/518-520; 346/154, 160; 358/300

[56] References Cited

U.S. PATENT DOCUMENTS

4,491,875 1/1985 Kawamuka ......................... 358/300
4,680,646 7/1987 Ikeda et al. ......................... 346/160

Primary Examiner—Arthur G. Evans
Attorney, Agent, or Firm—McCormick, Paulding & Huber

[57] ABSTRACT

A method and apparatus that provides skip line asynchronous imaging is characterized by a controller that computes pixel signals in a sequence of arrays and stores those arrays in a buffer. A controller will adjust the rate advancement of the write platen and synchronize therewith the presentation of a signal array to a mirror facet should the controller determine that the next line of data is not ready for imaging.

13 Claims, 4 Drawing Sheets

METHOD AND APPARATUS PROVIDING SKIP LINE ASYNCHRONOUS IMAGING

TECHNICAL FIELD

This invention relates to laser raster scanners, and more particularly to a method and apparatus used with laser raster scanners that provides skip line asynchronous imaging.

BACKGROUND OF THE INVENTION

High speed optical scanning systems such as precision plotters, printers and the like are well known in the art. These devices are direct imaging systems and are used to fabricate printed circuit boards (PCB) and printing plates by raster scanning an exposure beam across a film emulsion which is further processed into a printed circuit board phototool or a printing plate artwork, respectively. A typical system as marketed by the Gerber Scientific Instrument Company, the assignee of the present application, consists of a magnetic tape drive, hard disk, computer interactive graphics terminal, image processor, and optical table having a scanner. The system may also include such optics, media carriage and electronics as is necessary to directly transfer computer aided design (CAD) data to a printed circuit board phototool or transfer fonts, graphics and halftoned images into a printing plate artwork.

In operation, the direct imaging system is configured to receive on a write platen a planar substrate of film which has an optically sensitive media upon its surface. The computer provides signals to an exposure beam generator that modulates the intensity of a scanned optical exposure beam, usually provided by a laser, to expose selected portions of the substrate. Typically, a reference beam is scanned across a reference mask and a detector simultaneously with the exposing beam for providing a scanned timing signal to accurately indicate the position of the exposure (or write beam) on the substrate. A flat field scanning system is sometimes employed to focus the beams and to accomplish the simultaneous scanning of the beams across a reference mask and the substrate, respectively. Precision air bearings are often used to guide the write platen as the substrate is scanned or "imaged".

In known laser raster scanning systems where the optical deflector is a multi-faceted mirror, the mirror is rotated at a fixed, selected speed such that the exposure beam is advanced at a constant rate. However, it is possible with these known systems to have the computation rate of pixel signals or "pixels" from the computer fall behind the imaging rate of the exposure beam. When this occurs, only a portion of the scan line will be exposed.

It would be advantageous to have a laser raster scanning system which automatically compensates for unacceptable differences between the rate at which the computer generates signals to modulate the exposure beam and the system scan or imaging rate. The present invention is drawn towards such a system.

SUMMARY OF THE INVENTION

An object of the present invention is to provide an apparatus for use with a laser scanning system which will provide compensation for differences in the rate of pixel signal generation and the rate at which these pixel signals can be impressed on a substrate.

According to the present invention, a laser raster scanner includes an addressable exposure beam generator having a modulator and having a multi-faceted mirror with a plurality of reflective facets that rotate at a selected speed. The scanner repetitively moves a modulated exposure beam across a scan line in a direction on a substrate. A write platen receives and moves the substrate at a selected speed in a direction perpendicular to the scan direction. A controller includes a computer for receiving input data signals and generating therefrom exposure signals. The exposure signals are grouped in sequential memory arrays, each of which are associated with a selected one of the scan lines. The computer further generates signals for advancing at a selected rate the write platen from a current position corresponding to the current scan to successive positions corresponding to successive scan lines. Each of the exposure signal arrays correspond to a modulated exposure beam presented to one of the mirror reflective facets as the facet rotates from a first position to a second position respectively corresponding to the beginning and end of a scan line. A buffer associated with the exposure beam generator stores an exposure signal array corresponding to the next scan line to be written or "imaged". A sensor determines whether all the pixels associated with that next scan line have been loaded into the buffer. A computer recursively determines when the current mirror facet is in the first position. If, at that time, the sensor indicates that the loading of the signal buffer is not complete, then control signals are provided by the computer to halt presentation of the buffered signals to the exposure beam generator and to correspondingly alter the write platen motion.

According to another aspect of the present invention, a laser raster scanner includes an addressable exposure beam generator having a modulator and having a multi-faceted mirror with a plurality of reflective facets that rotate at a selected speed. The scanner moves a modulated exposure beam across a scan line on a substrate. A write platen receives and moves the substrate at a selected speed in a direction perpendicular to the scan direction. A controller includes a computer for receiving input data signals and generating exposure signals therefrom. The exposure signals are grouped in sequential arrays, each of which correspond to a selected one of the scan lines. The computer further generates signals for smoothly advancing at a selected rate the write platen from a current position corresponding to the current scan line to successive positions corresponding to successive scan lines. Each of the exposure signal arrays correspond to a modulated exposure beam presented to one of the mirror reflective facets as the facet rotates from a first position to a second position respectively corresponding to the beginning and end of a scan line. A first buffer associated with the exposure beam generator stores an exposure signal array corresponding to the next scan line to be written. A first sensor determines whether all the pixels of the next scan line are present in the first buffer. A second buffer associated with the computer is included for storing a number of exposure signal arrays before presentation to the exposure beam generator. A second sensor determines the number of exposure signal arrays in the second buffer which are ready to be imaged in the buffer. If the number of stored exposure signal array in the second buffer corresponds to a preselected value, control signals are provided by the computer to alter the rate of presentation of the exposure beam signal arrays to the exposure beam generator buffer and provide signals to correspondingly alter the write platen motion. The computer recursively determines when the current mirror facet is in the first position. If the first sensor indicates that the first buffer does not contain all of the exposure signals for the next scan line, then control signals are provided by the computer to halt presentation of the first buffered signals to the exposure beam generator and adjust write platen motion.

DESCRIPTION OF THE PREFERRED EMBODIMENT

Figure 1:
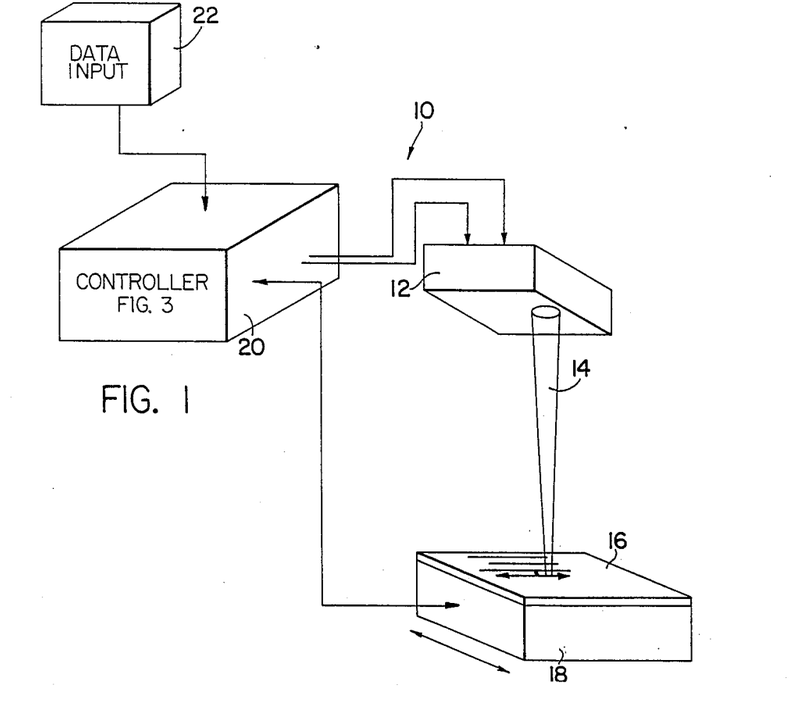
FIG. 1 is a simplified schematic illustration of a laser scanner providing skip line asynchronous imaging according to the present invention.

Referring now to FIG. 1, there is schematically shown an illustration of a laser raster scanner 10 provided according to the present invention. The scanner includes an exposure beam generator 12, that is detailed hereinafter with respect to FIG. 2. The 12 beam generator selectively outputs an exposure beam 14 onto a photosensitive surface on a carrier or substrate 16 positioned on an advancement means, such as a movable write platen 18.

Both the write platen and the generator 12 receive signals from a controller 20. As detailed hereinafter wtih respect to FIG. 3, the controller receives signals from a data input device 22 and generates therefrom pixel signals to modulate the exposure beam in accordance therewith. As noted above, it is possible for the rate at which the controller generates pixel or modulation signals (corresponding to individual pixels in the scanned exposure beam) to decreasse to a value less than the scan or "image" rate, that is, the rate which the exposure beam is moved across a single scan line. Moreover, it is further possible for the controller data rate to decrease to a value such that the speed at which the write platen is moved or indexed from scan line to scan line becomes too great when compared with the controller data rate. The present invention is characterized by a controller and imaging device that compensate for the differences possible between these data rates.

Figure 2:
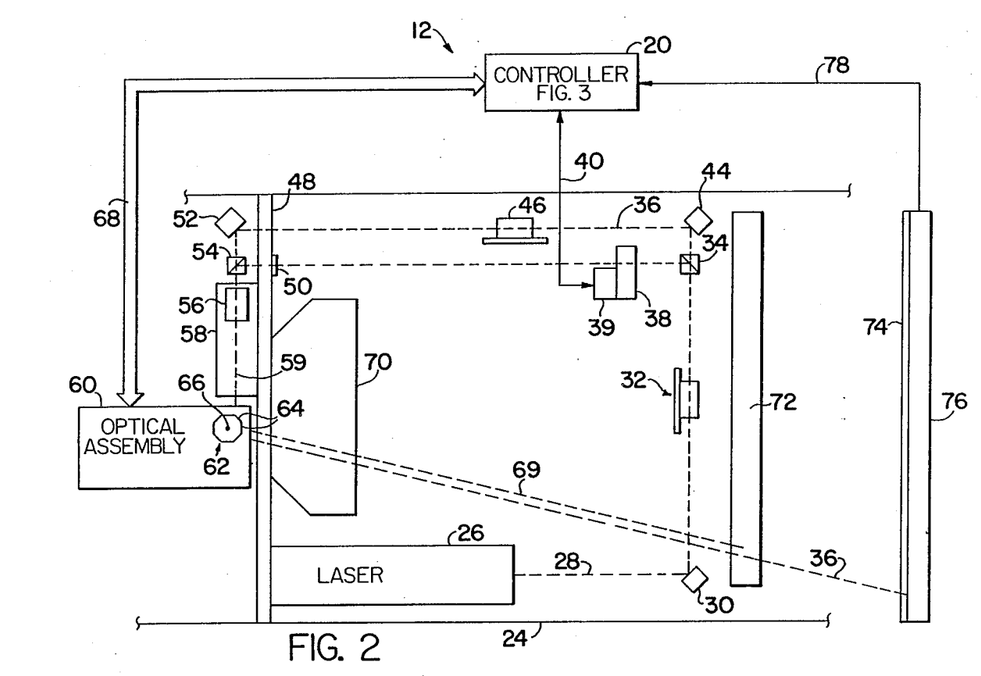
FIG. 2 is a top view of an exposure beam generator used in the scanner of FIG. 1.

Referring now to FIG. 2, there is shown a simplified illustration of the exposure beam generator 12 of FIG. 1. In a case 24 there is housed an optical source 26, preferably a Cyonics 3 mW Argon laser, that provides a beam 28 which is received by a first turning mirror 30 and is presented therefrom to a beam forming optics 32. The beam forming optics is conventional and can comprise a bandwidth lens, negative lens, pinhole and a transform lens assembly as is required by the specific application.

The formed beam is received by a first beam splitter 34 which splits off a referenc beam 36. The beam 28 is presented to a conventional acousto-optic modulator 38 that modulates intensity of the beam in response to the pixel signals received on line 40 from controller 20. Associated with the modulator 38 is a buffer 39 which stores the pixel signals prior to presentation to the modulator. Buffer 39 is diagrammatically shown in FIG. 2 and comprises a line buffer (or multiple line buffers) of a known type for receiving the array of pixel signals corresponding to the next scan line. Similarly, the reference beam is turned by second turning mirror 44 and is presented to a reference beam forming optics 46 which typically includes lenses and other optical components similar to those beam forming components detailed above. The reference beam is passed through an opening in bulkhead 48 while the beam 28 is passed through aperture 50. The reference beam is received by a turning mirror 52 and presented to a beam combiner 54. Beam combiner 54 also receives the beam 28, and presents a combined beam to collimating lens 56 in prism assembly 58.

The combined beam 59 is received by an optical assembly 60 that comprises a polygonal mirror 62 having a plurality of mirror facets 64 which is rotated about an axis 66 in response to signals received from the controller on line 68. The reference beam 36 and an exposure beam 69 are received by a conventional F theta scan lens 70. The exposure beam is received by final folding mirror 72 and presented to the write platen out of the plane of the scanner. The reference beamm is simultaneously presented to a reference mask 74 and ultimately received by a photodetector array 76. The photodetector array provides a signal indicative of the received reference beam to the controller on line 78 for controlling the timing, and hence the modulation of the scanned beams. The controller comprises such processor and memory means as necessary to perform the functions detailed herein.

Figures 3, 6:
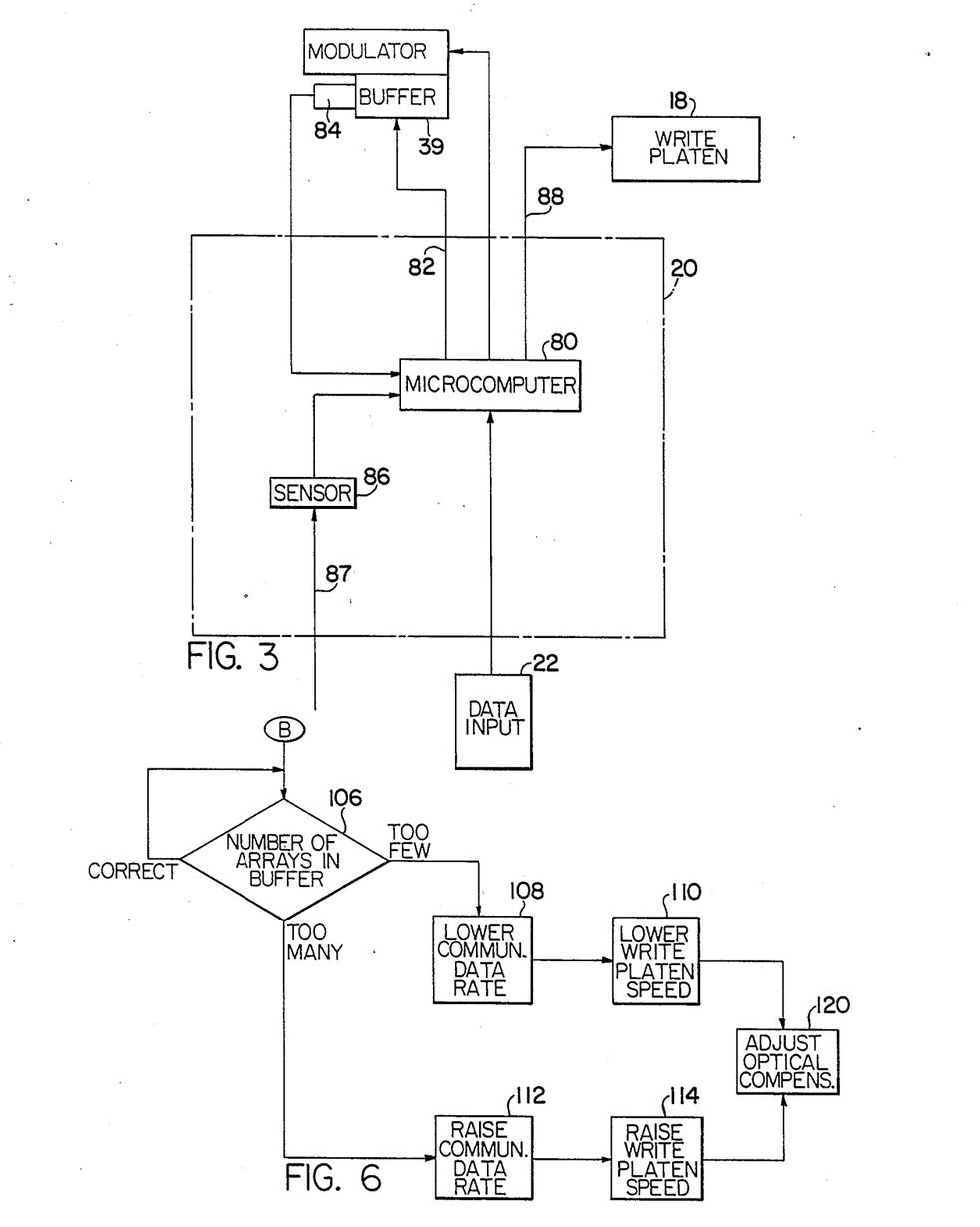
FIG. 3 is a schematic illustration of the controller of FIG. 1.
FIG. 6 is an illustration diagrammatically showing an algorithm used by the controller of FIG. 5.

FIG. 3 is a simplified illustration of the controller 20 of the laser scanner of FIG. 1. The controller receives signals from the data input device 22 and calculates by means of computer 80 the pixel signals to be presented on line 82 to the acousto-optic modulator buffer 39 (FIG. 2), part of the exposure beam generator 12. These pixel signals are grouped in arrays, with each array corresponding to a single scan line.

As noted above, the data rate of the controller is variable, depending in part on the information content of the data input signals. The fastest data rate associated with the controller occurs with low complexity data which can match the maximum rate of the exposure beam generator. The slowest data rate occurs when a scan line data signal array comprises signals whose value alternates between a logical "1" or "0".

The data rate of the exposure beam generator in the embodiment of FIG. 3 is a function of a fixed rotational speed of the multi-faceted mirror as well as the rate at which signals are received in buffer 39. Those skilled in the art will note that the rate at which data leaves the buffer 39 must correspond to the rate at which the exposure beam advances across a scan line (e.g. the scan or image rate). Therefore, the maximum exposure beam generator data rate is selected to be greater than the controller data rate. In other words, the rate of supplied data can never exceed the maximum rate of consumption so that data can not be lost. Typically, the exposure beam generator has a maximum data rate (or rate at which pixels signals are consumed) of 33 million pixels per second.

The present invention provides compensation for those instances where the data rate of the computer lags that of the exposure generator and is characterized by a sensor 84 associated with the modulator which determines in a known manner whether the buffer 39 has received all those pixel signals associated with the next scan line. The computer 20 also receives signals on line 87 from a sensor 86 that determines mirror facet rotational position. If, at the instant the mirror is in the position corresponding to the beginning of a scan line and ready to begin exposing the substrate with the next scan and if all of the corresponding pixel signls for that array have not been received in the buffer, the computer will disable the presentation thereof to the acousto-optic modulator and the exposure beam to the present mirror facet, thereby "skipping" that facet. This decision is made recursively for each mirror facet in succession should the discrepancy between data rate magnitudes so warrant, as evidenced by an incomplete signal array in buffer 39.

Moreover, the controller must alter the movement of the write platen in accordance with the above pixel signal presentation decision. In the embodiment of FIG. 3, the controller halts the write platen motion by means of control signals presented on line 88 should one or more facets be "skipped" in order to maintain the integrity of the artwork and then advances the write platen accordingly. If the write platen is alternatively moved in a continuous manner, the controller also adjusts the write platen velocity in accordance with the desired data rate. The laser scanner would then also comprise a generator as detailed hereinafter of a known type for optically displacing the exposure beam by an amount commensurate with the change in write platen velocity.

Figure 4:
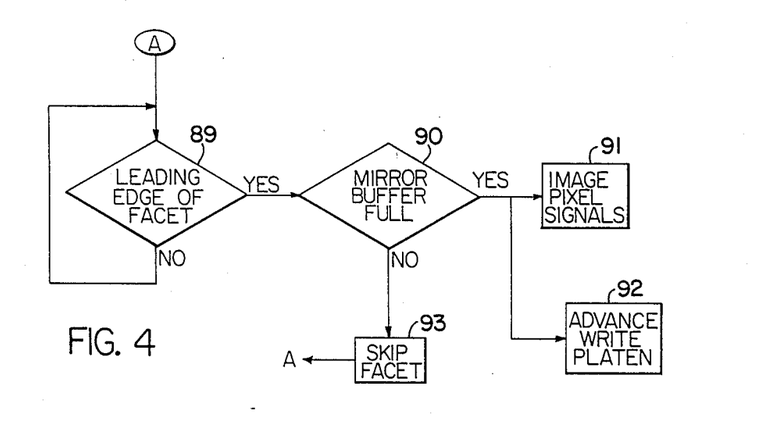
FIG. 4 is an illustration diagrammatically showing an algorithm used by the controller of FIG. 3.

The operation of the controller can be described with respect to the flow chart illustrated in FIG. 4. Initially at "A" the controller 20 determines the rotating mirror position (block 89). When the mirror has rotated so that the current facet is in a first position corresponding to the beginning of the next scan line, the controller 20 interrogates the buffer 39 to determine if all of the pixel signals for the next scan line have been received (block 90). If all signals are resident in the buffer 39, the controller enables the modulator (block 91), writes the scan line and indexes the write platen (block 92). Should the buffer 39 not contain all of the pixel signals, the current facet is skipped (block 93).

Figure 5:
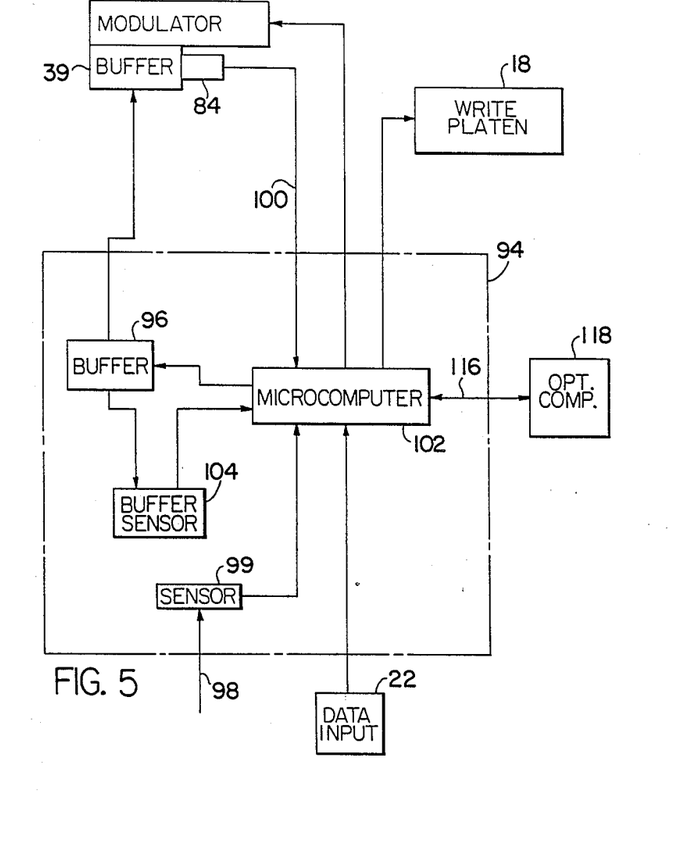
FIG. 5 is a schematic illustration of an alternative controller to that of FIG. 3.

Referring now to FIG. 5, there is schematically illustrated a preferred controller 94 which is substantially the same as controller 20 but is characterized by a buffer 96 of a known type which stores approximately 500 to 1000 scan line signal arrays before presentation to modulator buffer 39. The controller also receives on line 98 signals indicative of mirror position at mirror position sensor 99 and modulator buffer content (line 100) from buffer sensor 84. Computer 102 initially generates scan line signal arrays in response to data input signals in a manner described hereinabove with respect to FIG. 3.

Buffer 39 preferably comprises three sequentially addressed circular full scan line data buffer elements capable of read or write operation. At any given time the first buffer element receives a pixel signal array, the second has pixel signal arrays stored therein, while the third presents a pixes signal array to the modulator at the exposure data rate. Buffer 39 receives data from array buffer 96 at a selected data rate referred to as the buffer-to-buffer communication rate. The preferred buffer 96 is divided into 16 circularly sequenced bands of 32 arrays per band. The controller obtains the difference in address between the current band being written and the band being read to determine the number of stored data arrays and hence controls the buffer-to-buffer communication rate.

The operation of the preferred controller can be understood with reference to FIGS. 4 and 6. The decision to image or scan the next scan line or "skip" the current facet is, in the preferred embodiment, based on the same criteria as the embodiment of FIG. 3. That is, whether or not all of the signals for the next scan line are present in the exposure generator buffer 39 at the start of the current facet. However, the preferred controller also includes a sensor 104 which determines the number of stored signal arrays in the buffer 96 and adjusts, in dependence thereon, the buffer to buffer communication rate. This communication rate is varied to compensate for the varying controller pixel generation rate. The variable communication rate ultimately allows for variability in the scan or imaging rate which is the overal rate at which the exposure beam generator consumes pixel signals and impresses data on to the substrate.

As noted above, the upper bound of the rate at which the exposure beam generator impresses data on to the substrate (the pixel signal consumption or imaging rate) is determined by the rotational speed of the mirror, and is consequently fixed at a maximum value for any individual scan line. Preferably, the variability in the imaging rate is achieved as a result of skipped mirror facets and, hence, potential scan lines caused by the change in the buffer to buffer communication rate. The number of facets to be skipped is then automatically dependent on the communication rate.

For example, if the controller data rate has slowed from an initial value (block 106, FIG. 6), the number of stored arrays will begin to decrease. Sensor 104 measures the number of buffered data arrays and adjusts the communication rate downward accordingly (block 108). A decrease in the communication data rate will result in instances when the modulator buffer 39 will not have all the signals corresponding to the next scan line when the next facet is in position to write data, and therefore some number of facets will be skipped. The controller must also adjust the write platen speed (block 110). In FIG. 6, blocks 112–114 illustrate the controller actions when the number of buffered arrays is above the selected number. Alternatively, the number of buffered signal arrays can be adjusted by selecting the number of facets which are skipped to approximately match the pixel signal generation rate of the computer and thereby maintain a selected number of signal arrays in the controller buffer.

For the preferred controller, the maximum imaging rate is set to be 33 million pixels per second (Mp/s). If the computer pixel signal generation rate (controller data rate) should drop to one half that value (16.5 Mp/s), the controller provides signals to reduce both the communication data rate and the write platen speed by one half. Similarly, the computer adjusts the write platen speed in one eight full value increments in proportion to the number of prepared signal arrays in the buffer so that imaging occurs at full eight/eighths, seven/eighths, six/eighths, five/eighths, four/eighths, three/eighths, two/eighths or one/eighth. Of course, imaging at a slower speed allows more time for pixel signal generation by the computer which will tend to increase the level of signal arrays available.

The write platen motion is preferably continuously variable as described above. However, velocity control in the "fast" scan direction (i.e., along the scan line)

cannot be so easily accomplished, since mirror motion is continuous and smooth. As noted above, the write platen velocity is dependant on the number of signal arrays in the buffer. The rate of pixel signal presentation to the exposure beam generator is made to be dependant on the number of signal arrays in the data buffer and matched to the platen velocity. It is readily apparent, then, since the computer data rate is slower than (or equal to) the maximum rate of pixel signal consumption, that there will be instances when the number of buffered signal arrays is unacceptably small by the time a mirror facet is in the first position corresponding to the beginning of the current scan line. In this instance, then, that mirror facet will be skipped in a manner as described above. This "skip decision" is made at the first position of each facet recursively, preferably dependant only on whether a complete signal array is present in the modulator buffer or alternatively dependant, for example, on the number of signal arrays in the controller buffer.

As described above, the write platen motion in the preferred embodiment is continuously variable and must be controlled to accommodate the average rate of data computation. Consequently, a scan line error is introduced in the position of the write platen when a facet is skipped such that actual location of a scan line will be at variance with the desired position. A controller provided according to the present invention determines the scan line position in a known manner by means of signals received on line 116 from an optical deflector mechanism 118 and provides thereto signals for appropriately displacing the exposure beam in the platen motion direction to remove that error (block 120, FIG. 6). The optical deflector can be any of a type known in the art. Also, it is normally sufficient that when a scan line is skipped signals corresponding to all "0's" or "1's" are sent to the modulator for that scan line, as is appropriate for the polarity of the media.

Similarly, although the invention has been shown, and described with respect to a preferred embodiment thereof, it should be understood by those skilled in the art that various other changes, omissions and additions thereto may be made therein without departing from the spirit and scope of the present invention.

I claim

1. A control apparatus for use in a laser raster scanner that, in response to input data signals, scans an exposure beam across a substrate mounted on a movable write platen in a sequence of scan lines by means of an exposure beam generator that includes a multi-faceted rotating mirror, said control apparatus comprising:
    a computation means for receiving said input data signals and for generating exposure signals therefrom grouped in sequential arrays each of which is associated with a selected one of the scan lines, said computation means further generating signals for advancing the write platen from a current position corresponding to the current scan line to successive positions corresponding to successive scan lines, each of said exposure signal arrays corresponding to a modulated exposure beam presented to a one of the mirror facets as said facet rotates from a first position to a second position respectively corresponding to the beginning and the end of a scan line;
    a buffer for receiving a signal array for the next scan line;
    a detector means for providing signals indicative of said mirror facet rotational position; and
    a sensor for generating signals indicative of the exposure signals received by said buffer;
    said computation means recursively determining from said sensor signals and detector means signals indicative of said mirror position when the current mirror facet is in said first position and providing control signals to the exposure beam generator for disabling the presentation of said next scan line signal array and for altering the write platen motion if all of the exposure signals corresponding to said next scan line have not been received by said buffer.

2. The apparatus of claim 1 wherein the laser scanner includes a means for continuously advancing the write platen, said apparatus further comprising:
    a means for measuring exposure beam displacement error defined as the displacement difference between an actual exposure beam position on the substrate from a commanded exposure beam position;
    an optical deflector means for selectively providing a displacement to the exposure beam from said scan line in a write platen motion direction; and
    wherein said computation means further comprises a means for determining when said computation means has enabled the presentation of said buffered exposure signal array and comprises a means for providing signals to said optical deflector means to displace from said scan line the exposure beam by a selected amount, thereby correcting for the exposure beam displacement error.

3. The apparatus of claim 1 wherein the laser scanner includes a means for indexing the write platen through positions corresponding to a sequence of scan lines, said computation means further comprising a means for halting the advancement of said write platen to a next scan line position only if said computation means halts the presentation of said next scan line signal array.

4. A laser raster scanner, comprising:
    an addressable exposure beam generator means having a multi-faceted rotating mirror and an exposure beam modulator, said generator means for moving an exposure beam across a substrate in a sequence of scan lines;
    a movable write platen for receiving said substrate;
    a control apparatus including a computation means for receiving input data signals and generating therefrom exposure signals at a signal generation rate, said exposure signals grouped in sequential arrays each of which are associated with a selected one of the scan lines, said computation means further generating signals for advancing said write platen from a current position corresponding to the current scan line to successive positions corresponding to successive scan lines, each of said exposure signal arrays corresponding to a modulated exposure beam presented to a one of said mirror reflective facets as said facet rotates from a first position to a second position respectively corresponding to the beginning and the end of a scan line;
    a detector means for providing signals indicative of said mirror facet rotational position;
    a first buffer for receiving and storing a plurality of said signal arrays from said control apparatus;

a second buffer associated with said exposure beam generator means for sequentially receiving from said first buffer each of said stored signal arrays at a buffer to buffer communication rate before presentation to said modulator;

a first sensor for generating signals indicative of the number of signal arrays stored by said first buffer; and a second sensor for generating signals indicative of the number of said exposure beam signals of a next signal array present in said second buffer;

said control apparatus, receiving said first and second sensor signals and detector means signals indicative of said mirror position, for adjusting said communication date rate in dependence on the number of stored signal arrays in said first buffer and for recursively determining when a mirror facet is in said first position and providing control signals to the exposure beam generator disabling the presentation of said second buffer scan line signal array and altering said write platen motion if all of the signals corresponding to the next signal array have not been received in said second buffer.

5. The apparatus of claim 4 further comprising:

a means for measuring exposure beam displacement error defined as the displacement difference between an actual exposure beam position on the substrate from a commanded exposure beam position; and an optical deflector means for selectively providing a displacement to the exposure beam from said scan line in a write platen motion direction;

wherein said computation means further comprises a means for determining when said computation means has disabled and subsequently enabled the presentation of said buffered exposure signal array and comprises a means for providing signals to said optical deflector means to displace from said scan line the exposure beam by a selected amount, thereby correcting for the exposure beam displacement error.

6. The laser raster scanner of claim 4 wherein said computation means further comprises a means for selecting a number of mirror facets to be skipped in dependence on the number of stored signal arrays in said first buffer.

7. The apparatus of claim 4 wherein the laser scanner includes a means for indexing the write platen through positions corresponding to a sequence of scan lines, said computation means further comprising a means for halting the advancement of said write platen to a next scan line position only if said computation means halts the presentation of said next scan line signal array.

8. A method of raster scanning a laser beam across a substrate configured on a movable write platen, said method comprising the steps of:

providing an addressable exposure beam generator means having an exposure beam modulator and a multi-faceted mirror rotating at a selected speed, thereby moving a modulated exposure beam across a scan line on a substrate;

moving said write platen at a selected speed in direction approximately perpendicular to the scan line direction in accordance with received signals;

computing exposure beam signals by means of a control apparatus that receives input data signals, said exposure beam signals grouped in sequential arrays each of which correspond to a selected one of the scan lines, further generating signals to advance the write platen from a current position corresponding to the current scan line to successive positions corresponding to successive scan lines, each of said exposure signal arrays corresponding to a modulated exposure beam presented to a one of said mirror reflective facets as said facet rotates from a first position to a second position respectively corresponding to the beginning and the end of a scan line;

storing in a first buffer one of said exposure signal arrays before presentation to said exposure beam modulator;

sensing the number of exposure beam signals in said first buffer;

recursively determining when the current mirror facet is in said first position; and providing control signals to the exposure beam generator disabling the presentation of said buffered scan line signal array and altering said write platen motion if all of said exposure beam signals associated with said buffered signal array have not been received in said first buffer.

9. The method of claim 8 further comprising the steps of:

storing in a second buffer associated with said computation means a plurality of said exposure beam signal arrays;

sensing the number of stored signal arrays in said second buffer;

providing said stored signal arrays to said first buffer at a buffer communication rate;

adjusting said communication rate in dependence on the number of said exposure beam signal arrays stored in said second buffer.

10. The method of claim 9 further comprising the steps of:

determining, when a facet has been skipped, a value of optical displacement error defined as the difference between an actual position of the exposure beam on the substrate and a commanded position thereon;

optically displacing said exposure beam along said substrate to remove said optical displacement error.

11. The method of claim 8 further comprising the steps of indexing the write platen through positions corresponding to a sequence of scan lines and halting the advancement of said write platen to a next scan line position only if said computation means halts the presentations of said next scan line signal array.

12. A laser raster scanner, comprising:

an addressable exposure beam generator having a multi-faceted rotating mirror and an exposure beam modulator, said generator means for moving an exposure beam across a substrate in a sequence of scan lines;

a movable write platen for receiving said substrate;

a control apparatus including a computation means for receiving input data signals and generating therefrom exposure signals at a signal generation rate, said exposure signals grouped in sequential arrays each of which correspond to a selected one of the scan lines, said computation means further generating control signals for cooperatively advancing said write platen from a current position corresponding to the current scan line to successive positions corresponding to successive scan lines, each of said exposure signal arrays corresponding to a modulated exposure beam presented to a one of said mirror reflective facets as said facet rotates from a first position to a second position respectively corresponding to the beginning and the end of a scan line;

a detector means for providing signals indicative of said mirror facet rotational position;

a first buffer for receiving and storing a plurality of said signal arrays from said control apparatus;

a second buffer associated with said exposure beam generator means for sequentially receiving from said first buffer each of said stored signal arrays at a buffer to buffer communication rate before presentation to said modulator;

a first sensor for generating signals indicative of the number of signal arrays stored by said first buffer; and a second sensor for generating signals indicative of the number of said exposure beam signals of a next signal array are present in said second buffer;

said control apparatus receiving said first and second sensor signals and detector means signals indicative of mirror facet position for adjusting said communication data rate in dependence on the number of stored signal arrays in said first buffer and for recursively determining when a mirror facet is in said first position and providing control signals to the exposure beam generator for disabling the presentation of said second buffer scan line signal array and control signals for altering said write platen motion if the number of stored signal arrays in said first buffer is less than a selected value therefor.

13. A laser raster scanner for exposing images on a carrier, said scanner comprising:

a holder for holding a carrier with a photosensitive surface;

a scanning means for repeatedly scanning an exposure beam along a base line fixed relative to said scanning means and extending across the photosensitive surface of a carrier held by said holder;

advancement means for progressively moving said scanning means and said holder relative to one another along a line generally perpendicular to said base line to allow said beam to scan successive scan lines on said photosensitive surface;

means for generating pixel signals grouped in sequential arrays each of which arrays is associated with a respective one said scan lines;

means for modulating the intensity of said beam during its movement along said base line in accordance with one of said pixel signal arrays;

a buffer for receiving a pixel signal array for the next scan of said beam;

a detector providing a signal indicating the start of each scan of said beam along said base line;

a sensor providing a signal indicating the completeness of the pixel signal array stored in said buffer; and means responsive to said detector and sensor for disabling said modulating means and said advancement means if at the start of the next scan of said beam along said base line said buffer does not contain a complete array of pixel signals, so that during said next scan of said beam said movement of said scanner relative to said holder is interrupted and said beam is held at a non-exposing intensity throughout said scan to allow said buffer to become filled with a complete array of pixel signals before said modulating means and advancement means are again enabled at the start of another scan of said base line by said beam.

* * * * *